P. WAGNER.
APPARATUS FOR MEASURING THE THRUST OR PULL ON SHAFTS.
APPLICATION FILED JUNE 13, 1911.
1,063,626.
Patented June 3, 1913.
2 SHEETS—SHEET 2.
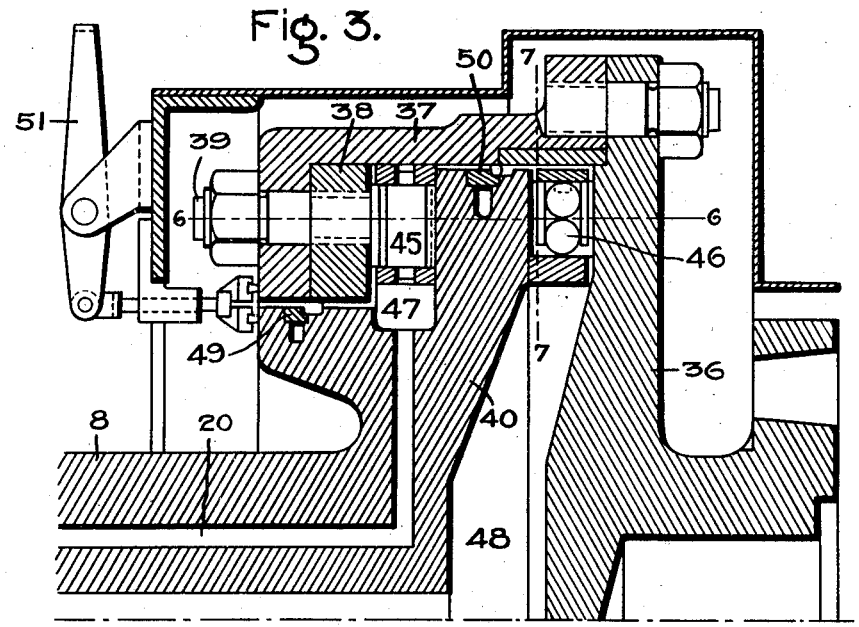
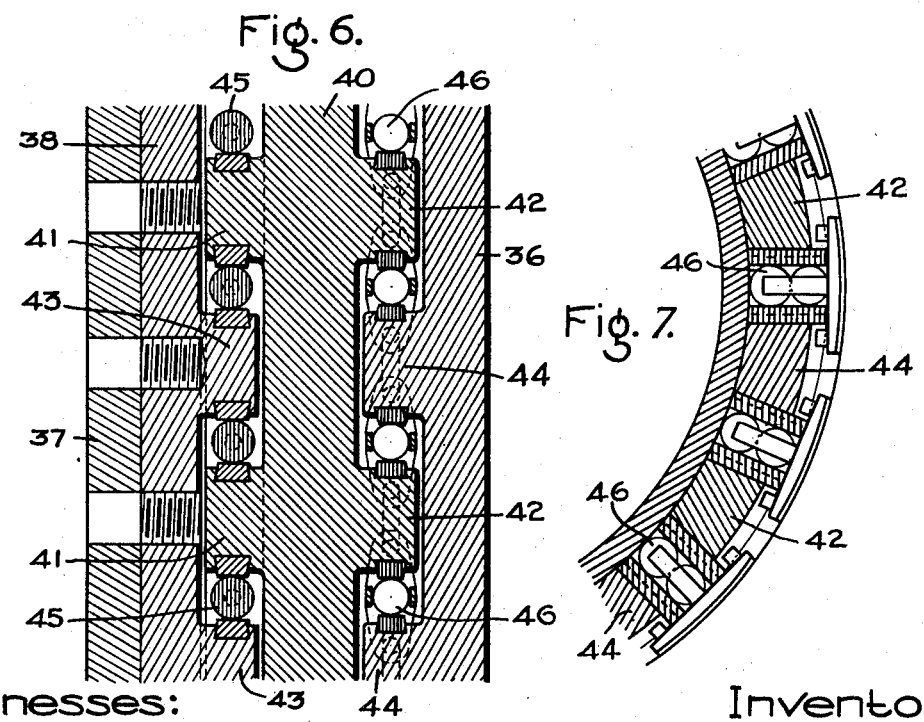
Witnesses:
Inventor,
Paul Wagner,
by
Att'y.

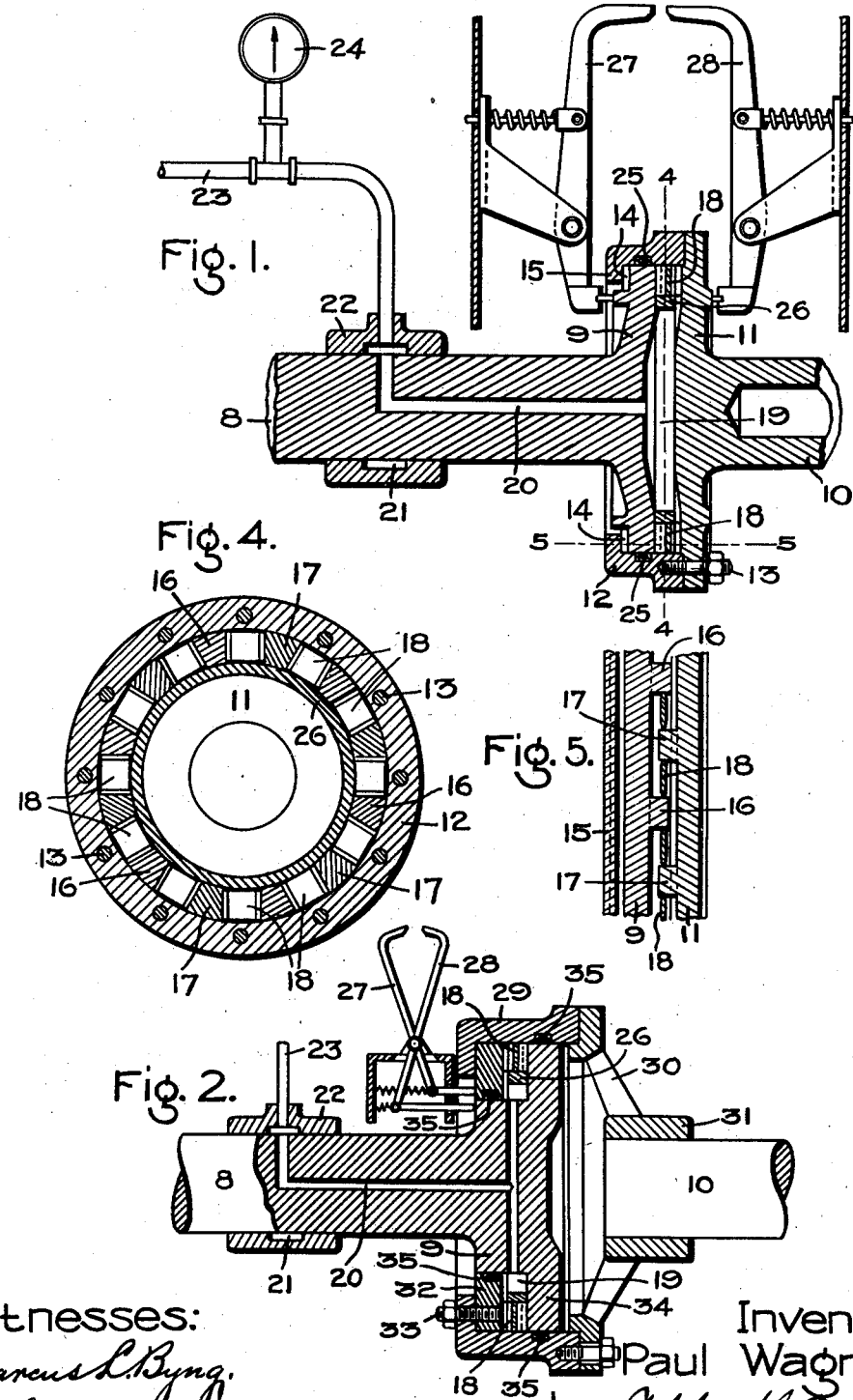

UNITED STATES PATENT OFFICE.

PAUL WAGNER, OF CHARLOTTENBURG, GERMANY, ASSIGNOR TO GENERAL ELECTRIC COMPANY, A CORPORATION OF NEW YORK.

APPARATUS FOR MEASURING THE THRUST OR PULL ON SHAFTS.

1,063,626.

Specification of Letters Patent.

Patented June 3, 1913.

Application filed June 13, 1911. Serial No. 632,916.

*To all whom it may concern:*

Be it known that I, PAUL WAGNER, a subject of the King of Prussia, residing at Charlottenburg, Germany, have invented certain new and useful Improvements in Apparatus for Measuring the Thrust or Pull on Shafts, of which the following is a specification.

This invention relates to apparatus for measuring the axial forces acting upon shafts and other similar machine elements.

The object of the invention is the provision of improved means for measuring the thrust or pull upon a shaft with but a relatively small expenditure of energy, the shaft being made with alined portions that are in sliding engagement with each other and a chamber being provided between the ends of said portions into which fluid under pressure can be forced.

In the accompanying drawings illustrating some of the embodiments of the invention, Figure 1 is a sectional view of a shaft also showing devices for measuring the thrust on the shaft; Fig. 2 is a similar view of a modification arranged for measuring the pull on a shaft; Fig. 3 is a partial sectional view of another modification; Fig. 4 is a section on the line 4—4 of Fig. 1; Fig. 5 is a partial development of the cylindrical section at the line 5—5 of Fig. 1; Fig. 6 is a similar development of a cylindrical section at the line 6—6 of Fig. 3; and Fig. 7 is a partial section on the line 7—7 of Fig. 3.

Referring to Figs. 1, 4 and 5, the portion 8 of the shaft carries a substantially rigid disk 9 and the portion 10 of said shaft carries a similar disk 11. A rim 12 is secured to the disk 11 by the bolts 13. The disk 9 is in sliding engagement with the inside of the rim. In the position of the parts shown in Fig. 1, there is a clearance at 14 between the disk 9 and the annular projection 15 on the rim 12 that permits a relative axial movement of the two portions of the shaft. The opposed faces of the disks 9 and 11 are provided with lugs or projections 16 and 17, the lugs on one disk extending into the spaces between the lugs on the other. Rotary motion is transmitted from one set of lugs to the other by a series of coupling members 18, there being knife-edge or pivotal bearings between the members and the lugs which permit practically frictionless movement of the portions of the shaft relative to each other without affecting the transmission of rotary motion from one portion to the other. A chamber 19 is formed between the disks 9 and 11 and the rim 12. Fluid under pressure can be supplied to the chamber through the conduit or passage 20 formed in the shaft. This conduit receives fluid from the annular chamber 21 in a relatively fixed member 22 in which the shaft 8 rotates, the chamber 21 in turn being supplied with fluid under pressure from a suitable source, such as a pump, through the conduit 23. A pressure gage 24 is connected to the conduit 23. Leakage from the chamber between the disk 9 and rim 12 is prevented by suitable packing 25. The movement of the shafts 8 and 10 toward each other is limited by stops. The frames 26 that position and support the coupling members 18 can be made to serve as stops, or special stops may be provided, or in some cases the lugs 16 and 17 can be employed as stops. The position of the disks 9 and 11 relative to each other is indicated by means of the levers 27 and 28 mounted on suitable fixed supports adjacent to the shaft, which levers have their lower ends in contact with the disks 9 and 11 respectively.

In Fig. 2, the rim 29 corresponding to rim 12 of Fig. 1 is carried by a spider 30 having a hub 31 secured to the end of the shaft 10. An annular ring 32 is fastened to the rim 29 by the bolts 33. The lugs corresponding to the lugs 17 are carried by the ring 32 while the coöperating lugs are formed on the left face of the disk 34 carried by the shaft 8. The chamber for the pressure fluid is formed between the outer portion of the disk 34 and the ring 32, packing 35 being provided to prevent leakage from the chamber. The arrangement of the indicating levers is changed somewhat from that of Fig. 1 to suit the differences in the structure of the other parts.

In Figs. 3, 6 and 7, the disk 36 is carried by one portion of the shaft. A rim 37 is secured to the disk by bolts and has a ring 38 attached to its outer portion by means of the bolts 39. The shaft 8 carries a disk 40 provided with lugs 41, 42 that coöperate with the lugs 43 on the ring 38 and the lugs 44 on the disk 36 respectively. Rotary motion is transmitted from one set of lugs to the other by the anti-friction rollers 45 or the balls 46 which also permit axial movement of the shafts relative to each other. Two pressure fluid chambers 47, 48 are provided. Leakage from the chambers is prevented by the packings 49 and 50. Indicating mechanism 51 is used to show the relative positions of the shafts.

Under ordinary operating conditions, the two ends of the shafts 8 and 10 are held in such relative position by the stops that the pressure chamber has its minimum volume or capacity and the thrust or pull is transmitted from one shaft to the other by said stops. To measure the thrust of the shaft 8 fluid under pressure is forced into the chamber 19, Fig. 1, to balance said thrust until the shafts are moved to their neutral or central position, that is, the position in their unloaded condition, as indicated by the levers 27 and 28. The pressure necessary to produce this result will be indicated by the gage 24 which can be so graduated and calibrated as to show the thrust. In a similar manner the pull of the shaft 8 can be measured by the apparatus shown in Fig. 2, while with the apparatus of Fig. 3, the axial thrust can be measured by forcing pressure fluid into the chamber 48 and the pull can be determined by forcing the fluid into the chamber 47. When making the measurements care must be taken to have the coupling members 18 in a plane at right angles to the axis of the shaft when the shafts are in their central position, since with an oblique position of said members they influence, by a component of the torque, the amount of axial force to be measured and would, therefore, introduce an error into the measurements. The rollers and balls of Fig. 3 make this precaution unnecessary. Of course, the axial thrust and pull of a shaft may also be measured if the devices of Figs. 1 and 2 are both incorporated in a shaft.

From the foregoing it will be seen that the fluid pressure necessary to measure the thrust or pull has to be made but little greater than said thrust or pull since it has only the small additional frictional resistance of the limited movement of one portion of the shaft on the other to overcome. Hence the work done in making the measurements is reduced to a minimum.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In apparatus of the class described, the combination of two shafts arranged in substantially axial alinement and having the end of one adjacent to the end of the other, a member carried by the end of one shaft, a member carried by the end of the other shaft and in sliding engagement with the first member, there being a pressure chamber between said members to which fluid under pressure can be supplied, and means for transmitting rotary motion from one member to the other without interfering with the relative axial movement of the members.

2. In apparatus of the class described, the combination of two shafts arranged in substantially axial alinement to rotate together and having the end of one adjacent to the end of the other, a member carried by the end of one shaft and having an annular rim, a member carried by the end of the other shaft and in sliding engagement with said annular rim, there being a pressure chamber between said members, means for supplying fluid under pressure to the chamber, a pressure indicating device, and means for indicating the position of the members relative to each other.

3. In apparatus of the class described, the combination of two shafts arranged in substantially axial alinement and having the end of one adjacent to the end of the other, a member carried by the end of one shaft and having an annular portion, a disk-like member carried by the end of the other shaft and in sliding engagement with said portion, there being a chamber between the members to which fluid under pressure can be supplied, and means for transmitting rotary motion from one member to the other without interfering with the relative axial movement of the members.

4. In apparatus of the class described, the combination of two shafts arranged in substantially axial alinement and having the end of one adjacent to the end of the other, a member carried by the end of one shaft and provided with an annular rim, a disk-like member carried by the end of the other shaft and in sliding engagement with said rim, there being a chamber between the members, a conduit in one of the shafts for supplying fluid under pressure to the chamber, and anti-friction means for transmitting rotary motion from one member to the other while permitting relative axial movement of the members.

5. In apparatus of the class described, the combination of two shafts arranged in substantially axial alinement and having the end of one adjacent to the end of the other, a disk-like member carried by the end of one shaft that has an annular rim, a disk-like member carried by the end of the other shaft and in sliding engagement with said rim, and means for transmitting rotary motion from one member to the other while permitting relative axial movement of the members, said means including lugs on one member that are arranged in alternating relation to coöperating lugs on the other member.

6. In apparatus of the class described, the combination of two shafts arranged in substantially axial alinement and having the end of one adjacent to the end of the other, a disk-like member carried by the end of one shaft and having an annular rim, a disk-like member carried by the end of the other shaft and in sliding engagement with said rim, means for transmitting rotary motion from one member to the other while permitting relative axial movement of the members, said means including lugs that are arranged in alternating relation to coöperating lugs on the other member, and anti-friction devices between the opposed faces of said lugs.

7. In apparatus of the class described, the combination of two shafts arranged in substantially axial alinement and having the end of one shaft adjacent to the end of the other, a disk-like member carried by the end of one shaft and having an annular rim, a disk-like member carried by the end of the other shaft and in sliding engagement with said rim, means for transmitting rotary motion from one member to the other while permitting relative axial movement of the members, said means including lugs on one member that are arranged in interlapping relation to coöperating lugs on the other member, and anti-friction devices in rolling contact with the opposed faces of the lugs.

8. In apparatus of the class described, the combination of two shafts arranged in substantially axial alinement and having the end of one shaft adjacent to the end of the other, a disk-like member carried by the end of one shaft, an annular rim secured to said member, a disk-like member carried by the end of the other shaft and in sliding engagement with the interior of said rim, there being a ring on the outer edge of the rim that is of less internal diameter than the diameter of the second member, and means for transmitting rotary motion from one member to the other while permitting relative axial movement of said members.

9. In apparatus of the class described, the combination of two shafts arranged in substantially axial alinement and having the end of one adjacent to the end of the other, a disk-like member carried by the end of one shaft, an annular rim secured to said member, a disk-like member carried by the end of the other shaft and in sliding engagement with the interior of said rim, there being chambers formed on opposite sides on the second member between it and the first member and its rim, conduit means in one of the shafts for supplying fluid under pressure to the chambers, and anti-friction means for transmitting rotary motion from one member to the other while permitting relative axial movement of said members.

10. In apparatus of the class described, the combination of two shafts arranged in substantially axial alinement, a disk on the end of one shaft having an annular rim, a disk on the other shaft that is in lateral sliding engagement with the interior of said rim, there being a chamber between the two disks, and anti-friction means for transmitting rotary motion from one disk to the other and permitting relative axial movement thereof.

In witness whereof, I have hereunto set my hand this 27th day of May, 1911.

PAUL WAGNER.

Witnesses:
 GUST. HULBROCK,
 OSCAR EBERTH.